US008838860B2

(12) United States Patent
Gainey, Jr. et al.

(10) Patent No.: US 8,838,860 B2
(45) Date of Patent: *Sep. 16, 2014

(54) DETERMINING EXTENDED CAPABILITY OF A CHANNEL PATH

(71) Applicant: International Business Machines Corporation, Armonk, NY (US)

(72) Inventors: Charles W. Gainey, Jr., Poughkeepsie, NY (US); Daniel F. Casper, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/833,378

(22) Filed: Mar. 15, 2013

(65) Prior Publication Data

US 2013/0205050 A1   Aug. 8, 2013

Related U.S. Application Data

(63) Continuation of application No. 12/030,912, filed on Feb. 14, 2008, now Pat. No. 8,478,915.

(51) Int. Cl.
| | |
|---|---|
| *G06F 3/00* | (2006.01) |
| *G06F 13/12* | (2006.01) |
| *G06F 13/00* | (2006.01) |
| *G06F 12/00* | (2006.01) |
| *H04L 12/28* | (2006.01) |
| *H04J 3/00* | (2006.01) |

(52) U.S. Cl.
USPC .................. 710/74; 710/11; 710/14; 710/20; 710/62; 710/72; 710/107; 711/112; 711/154; 370/389; 370/476

(58) Field of Classification Search
USPC ........... 710/5, 11, 14, 20, 28, 62, 72, 74, 107, 710/113; 711/4, 112, 154; 370/389, 412, 370/476, 311, 338, 392
See application file for complete search history.

(56) References Cited

U.S. PATENT DOCUMENTS

| | | | |
|---|---|---|---|
| 3,943,283 | A | 3/1976 | Caragliano et al. |
| 4,004,277 | A | 1/1977 | Gavril |

(Continued)

FOREIGN PATENT DOCUMENTS

| | | |
|---|---|---|
| DE | 3931514 | 3/1990 |
| GB | 1264096 | 2/1972 |

(Continued)

OTHER PUBLICATIONS

Behrs, JR, "Adaptive Prediction Minimizes Data Overrun and Underrun", IBM, Nov. 1994, pp. 1-3. http://priorartdatabase.com/IPCOM/000114189.

(Continued)

*Primary Examiner* — Farley Abad
*Assistant Examiner* — Henry Yu
(74) *Attorney, Agent, or Firm* — Cantor Colburn LLP; John Campbell

(57) ABSTRACT

A computer program product includes a tangible storage storing instructions for performing a method. The method includes receiving a request at a channel subsystem in a host computer system from an operating system in the host computer system to provide a channel path description for a channel path, the channel subsystem configured to direct information flow between memory and the control unit via the channel path; and outputting from the channel subsystem to the operating system, a channel path description block including the channel path description for the channel path in response to the request. The channel path description block includes: a descriptor field (DESC) indicating that the channel path supports a Fiber Channel protocol for commanding an I/O operation; and an extension support indicator field (F) specifying whether the channel path supports an extension to the Fiber Channel protocol.

24 Claims, 11 Drawing Sheets

(56) References Cited

U.S. PATENT DOCUMENTS

| | | | |
|---|---|---|---|
| 4,374,415 A | 2/1983 | Cormier et al. | |
| 4,380,046 A | 4/1983 | Frosch et al. | |
| 4,455,605 A | 6/1984 | Cormier et al. | |
| 4,760,518 A | 7/1988 | Potash et al. | |
| 4,779,188 A | 10/1988 | Gum et al. | |
| 4,837,677 A | 6/1989 | Burrus, Jr. et al. | |
| 4,866,609 A | 9/1989 | Calta et al. | |
| 4,870,566 A | 9/1989 | Cooper et al. | |
| 5,016,160 A | 5/1991 | Lambeth et al. | |
| 5,031,091 A | 7/1991 | Wakatsuki et al. | |
| 5,040,108 A | 8/1991 | Kanazawa | |
| 5,386,512 A * | 1/1995 | Crisman et al. | 709/228 |
| 5,388,219 A * | 2/1995 | Chan et al. | 710/5 |
| 5,410,727 A | 4/1995 | Jaffe et al. | |
| 5,434,980 A | 7/1995 | Casper et al. | |
| 5,440,729 A | 8/1995 | Kimura et al. | |
| 5,461,721 A | 10/1995 | Cormier et al. | |
| 5,463,736 A * | 10/1995 | Elko et al. | 710/28 |
| 5,465,359 A | 11/1995 | Allen et al. | |
| 5,500,942 A | 3/1996 | Eickemeyer et al. | |
| 5,517,670 A | 5/1996 | Allen et al. | |
| 5,526,484 A | 6/1996 | Casper et al. | |
| 5,528,755 A | 6/1996 | Beardsley et al. | |
| 5,539,918 A | 7/1996 | Allen et al. | |
| 5,546,533 A * | 8/1996 | Koyama | 714/5.1 |
| 5,561,809 A | 10/1996 | Elko et al. | |
| 5,584,039 A | 12/1996 | Johnson et al. | |
| 5,600,793 A | 2/1997 | Nord | |
| 5,608,898 A * | 3/1997 | Turpin et al. | 1/1 |
| 5,613,163 A | 3/1997 | Marron et al. | |
| 5,640,600 A | 6/1997 | Satoh et al. | |
| 5,758,190 A | 5/1998 | Johnson et al. | |
| 5,768,620 A | 6/1998 | Johnson et al. | |
| 5,831,985 A | 11/1998 | Sandorfi | |
| 5,860,022 A | 1/1999 | Kondou et al. | |
| 5,894,583 A | 4/1999 | Johnson et al. | |
| 5,901,327 A | 5/1999 | Ofek | |
| 5,918,028 A | 6/1999 | Silverthorn et al. | |
| 6,070,070 A * | 5/2000 | Ladue | 455/419 |
| 6,125,399 A | 9/2000 | Hamilton | |
| 6,202,095 B1 * | 3/2001 | Beardsley et al. | 709/227 |
| 6,230,218 B1 * | 5/2001 | Casper et al. | 710/20 |
| 6,338,105 B1 | 1/2002 | Niizuma et al. | |
| 6,343,335 B1 | 1/2002 | Dahman et al. | |
| 6,347,334 B1 | 2/2002 | Fredericks et al. | |
| 6,353,612 B1 | 3/2002 | Zhu et al. | |
| 6,484,217 B1 | 11/2002 | Fuente et al. | |
| 6,546,435 B1 | 4/2003 | Yoshimura et al. | |
| 6,584,511 B1 | 6/2003 | Marsh, III et al. | |
| 6,609,161 B1 | 8/2003 | Young | |
| 6,609,165 B1 | 8/2003 | Frazier | |
| 6,647,016 B1 * | 11/2003 | Isoda et al. | 370/412 |
| 6,651,125 B2 | 11/2003 | Maergner et al. | |
| 6,654,954 B1 * | 11/2003 | Hicks | 717/162 |
| 6,658,603 B1 | 12/2003 | Ward | |
| 6,687,766 B1 | 2/2004 | Casper et al. | |
| 6,693,880 B2 | 2/2004 | Gregg et al. | |
| 6,694,390 B1 | 2/2004 | Bogin et al. | |
| 6,738,647 B1 * | 5/2004 | Link, II | 455/564 |
| 6,751,680 B2 | 6/2004 | Langerman et al. | |
| 6,772,207 B1 | 8/2004 | Dorn et al. | |
| 6,826,661 B2 | 11/2004 | Umbehocker et al. | |
| 6,839,773 B2 | 1/2005 | Vishlitzky et al. | |
| 6,862,322 B1 | 3/2005 | Ewen et al. | |
| 6,877,043 B2 * | 4/2005 | Mallory et al. | 709/251 |
| 6,882,634 B2 * | 4/2005 | Bagchi et al. | 370/338 |
| 6,898,202 B2 | 5/2005 | Gallagher et al. | |
| 6,910,149 B2 * | 6/2005 | Perloff et al. | 714/4.3 |
| 6,915,378 B2 | 7/2005 | Roberti | |
| 6,963,940 B1 * | 11/2005 | Glassen et al. | 710/107 |
| 7,000,036 B2 | 2/2006 | Carlson et al. | |
| 7,003,700 B2 * | 2/2006 | Elko et al. | 714/34 |
| 7,020,810 B2 | 3/2006 | Holman | |
| 7,035,540 B2 | 4/2006 | Finan et al. | |
| 7,046,665 B1 * | 5/2006 | Walrand et al. | 370/392 |
| 7,058,735 B2 | 6/2006 | Spencer | |
| 7,100,096 B2 | 8/2006 | Webb, Jr. et al. | |
| 7,111,130 B2 | 9/2006 | Blake et al. | |
| 7,120,728 B2 | 10/2006 | Krakirian et al. | |
| 7,124,207 B1 | 10/2006 | Lee et al. | |
| 7,133,988 B2 | 11/2006 | Fujibayashi | |
| 7,142,520 B1 * | 11/2006 | Haverinen et al. | 370/311 |
| 7,149,823 B2 | 12/2006 | Miller et al. | |
| 7,155,569 B2 | 12/2006 | Johnson et al. | |
| 7,164,425 B2 | 1/2007 | Kwak et al. | |
| 7,202,801 B2 | 4/2007 | Chou | |
| 7,266,296 B2 * | 9/2007 | Ovadia et al. | 398/51 |
| 7,277,387 B2 | 10/2007 | Sanders et al. | |
| 7,292,597 B2 | 11/2007 | Mills et al. | |
| 7,315,911 B2 | 1/2008 | Davies et al. | |
| 7,382,733 B2 | 6/2008 | Banerjee et al. | |
| 7,395,284 B2 | 7/2008 | Sato et al. | |
| 7,398,335 B2 | 7/2008 | Sonksen et al. | |
| 7,484,021 B2 * | 1/2009 | Rastogi et al. | 710/74 |
| 7,500,023 B2 | 3/2009 | Casper et al. | |
| 7,500,030 B2 | 3/2009 | Hathorn et al. | |
| 7,502,873 B2 | 3/2009 | Casper et al. | |
| 7,539,777 B1 | 5/2009 | Aitken | |
| 7,543,087 B2 | 6/2009 | Philbrick et al. | |
| 7,555,554 B2 * | 6/2009 | Manders et al. | 709/227 |
| 7,558,827 B2 | 7/2009 | Kawashima et al. | |
| 7,564,791 B2 | 7/2009 | Jayakrishnan et al. | |
| 7,577,772 B2 | 8/2009 | Sonksen et al. | |
| 7,577,773 B1 | 8/2009 | Gandhi et al. | |
| 7,594,057 B1 | 9/2009 | Gandhi et al. | |
| 7,599,360 B2 * | 10/2009 | Edsall et al. | 370/389 |
| 7,630,405 B1 * | 12/2009 | Gao et al. | 370/476 |
| 7,711,871 B1 | 5/2010 | Haechten et al. | |
| 7,743,197 B2 | 6/2010 | Chavan et al. | |
| 7,765,336 B2 | 7/2010 | Butler et al. | |
| 7,826,349 B2 | 11/2010 | Kaur et al. | |
| 7,840,717 B2 | 11/2010 | Flanagan et al. | |
| 7,840,718 B2 | 11/2010 | Ricci et al. | |
| 7,840,719 B2 | 11/2010 | Casper et al. | |
| 7,856,511 B2 | 12/2010 | Ricci et al. | |
| 7,941,570 B2 | 5/2011 | Flanagan et al. | |
| 8,169,938 B2 | 5/2012 | Duchscher et al. | |
| 2001/0030943 A1 | 10/2001 | Gregg et al. | |
| 2002/0062407 A1 | 5/2002 | Tateyama et al. | |
| 2002/0099967 A1 | 7/2002 | Kawaguchi | |
| 2002/0152338 A1 | 10/2002 | Elliott et al. | |
| 2002/0178404 A1 | 11/2002 | Austen et al. | |
| 2003/0056000 A1 | 3/2003 | Mullendore et al. | |
| 2003/0084213 A1 | 5/2003 | Brice, Jr. et al. | |
| 2003/0158998 A1 * | 8/2003 | Smith | 711/112 |
| 2003/0188053 A1 | 10/2003 | Tsai | |
| 2003/0208581 A1 | 11/2003 | Behren et al. | |
| 2004/0030822 A1 * | 2/2004 | Rajan et al. | 711/4 |
| 2004/0054776 A1 | 3/2004 | Klotz et al. | |
| 2004/0113772 A1 | 6/2004 | Hong Chou | |
| 2004/0136241 A1 | 7/2004 | Rapp et al. | |
| 2004/0151160 A1 | 8/2004 | Sanders et al. | |
| 2004/0193968 A1 | 9/2004 | Dugan et al. | |
| 2004/0210719 A1 | 10/2004 | Bushey et al. | |
| 2004/0260851 A1 | 12/2004 | Tu | |
| 2005/0018673 A1 | 1/2005 | Dropps et al. | |
| 2005/0102456 A1 * | 5/2005 | Kang | 710/113 |
| 2005/0105456 A1 | 5/2005 | Cookson et al. | |
| 2005/0108251 A1 | 5/2005 | Hunt | |
| 2005/0175341 A1 | 8/2005 | Ovadia | |
| 2005/0193029 A1 * | 9/2005 | Rom et al. | 707/200 |
| 2005/0204069 A1 | 9/2005 | Carlson et al. | |
| 2005/0223291 A1 | 10/2005 | Zimmer et al. | |
| 2005/0229033 A1 | 10/2005 | Tanaka et al. | |
| 2005/0257118 A1 | 11/2005 | Shien | |
| 2006/0036769 A1 | 2/2006 | Frey et al. | |
| 2006/0050726 A1 | 3/2006 | Ahmed et al. | |
| 2006/0085595 A1 | 4/2006 | Slater | |
| 2006/0159112 A1 | 7/2006 | Sundaram et al. | |
| 2006/0224795 A1 | 10/2006 | Muto et al. | |
| 2007/0005838 A1 | 1/2007 | Chang et al. | |
| 2007/0016554 A1 | 1/2007 | Dapp et al. | |
| 2007/0061463 A1 | 3/2007 | Hiramatsu et al. | |
| 2007/0072543 A1 * | 3/2007 | Paila et al. | 455/3.06 |

(56) References Cited

U.S. PATENT DOCUMENTS

| | | | |
|---|---|---|---|
| 2007/0079051 A1 | 4/2007 | Tanaka et al. | |
| 2007/0091497 A1 | 4/2007 | Mizuno et al. | |
| 2007/0162631 A1 | 7/2007 | Balakrishnan et al. | |
| 2007/0174544 A1 | 7/2007 | Yasuda et al. | |
| 2007/0239944 A1 | 10/2007 | Rupanagunta et al. | |
| 2007/0294697 A1* | 12/2007 | Theimer et al. | 718/102 |
| 2008/0040519 A1 | 2/2008 | Starr et al. | |
| 2008/0043563 A1 | 2/2008 | Brice et al. | |
| 2008/0059638 A1 | 3/2008 | Hathorn et al. | |
| 2008/0147889 A1 | 6/2008 | Casper et al. | |
| 2008/0147890 A1 | 6/2008 | Casper et al. | |
| 2008/0183877 A1 | 7/2008 | Carlson et al. | |
| 2008/0235553 A1 | 9/2008 | Chintada et al. | |
| 2008/0256264 A1 | 10/2008 | Muto et al. | |
| 2008/0273518 A1 | 11/2008 | Pratt et al. | |
| 2008/0307122 A1 | 12/2008 | Butler et al. | |
| 2009/0049241 A1 | 2/2009 | Ohno et al. | |
| 2009/0055585 A1 | 2/2009 | Fernandes et al. | |
| 2009/0144586 A1 | 6/2009 | Casper et al. | |
| 2009/0172203 A1 | 7/2009 | Casper et al. | |
| 2009/0172301 A1* | 7/2009 | Ebersole et al. | 711/154 |
| 2009/0210559 A1 | 8/2009 | Flanagan et al. | |
| 2009/0210560 A1 | 8/2009 | Yudenfriend et al. | |
| 2009/0210561 A1 | 8/2009 | Ricci et al. | |
| 2009/0210562 A1 | 8/2009 | Huang et al. | |
| 2009/0210563 A1 | 8/2009 | Flanagan et al. | |
| 2009/0210564 A1 | 8/2009 | Ricci et al. | |
| 2009/0210570 A1 | 8/2009 | Bendyk et al. | |
| 2009/0210571 A1 | 8/2009 | Casper et al. | |
| 2009/0210572 A1 | 8/2009 | Yudenfriend et al. | |
| 2009/0210573 A1 | 8/2009 | Yudenfriend et al. | |
| 2009/0210576 A1 | 8/2009 | Casper et al. | |
| 2009/0210579 A1 | 8/2009 | Bendyk et al. | |
| 2009/0210580 A1 | 8/2009 | Bendyk et al. | |
| 2009/0210581 A1 | 8/2009 | Flanagan et al. | |
| 2009/0210582 A1 | 8/2009 | Bendyk et al. | |
| 2009/0210583 A1 | 8/2009 | Bendyk et al. | |
| 2009/0210584 A1 | 8/2009 | Carlson et al. | |
| 2009/0210585 A1 | 8/2009 | Ricci et al. | |
| 2009/0210768 A1 | 8/2009 | Carlson et al. | |
| 2009/0210769 A1 | 8/2009 | Casper et al. | |
| 2009/0210884 A1 | 8/2009 | Ricci et al. | |
| 2009/0307388 A1 | 12/2009 | Tchapda | |
| 2010/0014526 A1 | 1/2010 | Chavan et al. | |
| 2010/0064072 A1 | 3/2010 | Tang et al. | |

FOREIGN PATENT DOCUMENTS

| | | |
|---|---|---|
| GB | 2291990 | 9/1995 |
| GB | 2291990 | 2/1996 |
| JP | 63236152 | 10/1988 |
| JP | 2010-140127 A | 6/2010 |
| WO | 2006102664 A2 | 9/2006 |

OTHER PUBLICATIONS

Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.

U.S. Appl. No. 12/031,038, Notice of Allowance Mailed Oct. 6, 2010.

U.S. Appl. No. 12/031,182 Final Office Action Mailed Jul. 22, 2010.

U.S. Appl. No. 12/031,182, Non Final Office Action Mailed Dec. 23, 2010.

U.S. Appl. No. 12/030,920, Notice of Allowance Mailed Dec. 28, 2010.

U.S. Appl. No. 12/030,920 Notice of Allowance Mailed Aug. 23, 2010.

U.S. Appl. No. 12/030,954, Notice of Allowance mailed Dec. 28, 2010.

U.S. Appl. No. 12/030,975, Notice of Allowance Mailed Oct. 19, 2010.

U.S. Appl. No. 12/030,932, Final Office Action Mailed Jul. 23, 2010.

U.S. Appl. No. 12/030,932, Non-Final Office Action Mailed Dec. 16, 2010.

U.S Appl. No. 12/031,023, Final Office Action Mailed Nov. 18, 2010.

U.S. Appl. No. 12/030,951, Final Office Action Mailed Oct. 26, 2010.

U.S. Appl. No. 12/030,961 Notice of Allowance Mailed Nov. 5, 2010.

U.S. Appl. No. 12/030,967 Notice of Allowance Mailed Oct. 7, 2010.

U.S. Appl. No. 12/031,201, Final Office Action Mailed Aug. 3, 2010.

U.S. Appl. No. 12/031,201, Non-Final Office Action Mailed Dec. 27, 2011.

U.S. Appl. No. 12/030,985, Notice of Allowance mailed Nov. 24, 2010.

U.S. Appl. No. 12/030,993, Final Office Action Mailed Dec. 10, 2010.

U.S. Appl. No. 12/031,042, Final Office Action Mailed Oct. 25, 2010.

U.S. Appl. No. 12/181,662, Notice of Allowance Mailed Aug. 4, 2010.

U.S. Appl. No. 12/364,615, Non Final Office Action Mailed Oct. 7, 2010.

U.S. Appl. No. 12/183,305, Notice of Allowance Mailed Nov. 1, 2010.

U.S. Appl. No. 12/183,315, Notice of Allowance Mailed Dec. 13, 2010.

U.S. Appl. 12/183,323, Non-Final Office Action Mailed Jan. 3, 2011.

IBM, "Method and Apparatus to Monitor PAV Utilization", Feb. 2005, pp. 1-3. http://priorartdatabase.com/IPCOM/000082878.

Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.

Moore et al., "Reconfiguration of Storage Elements to Improve Performance", IBM, Dec. 1983, pp. 1-3. http://priorartdatabas.com/IPCOM/000047719.

Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.

Dauby, et al. "Contention Resolution Between Two Processors"; IBM Technical Disclosure Bulletin; vol. 26; No. 10A; Mar. 1984; 3 pages.

DeVeer, J.A.; "Control Frame Multiplexing on Serial I/O Channels"; IBM Technical Disclosure Bulletin; vol. 32; No. 10A; Mar. 1990; pp. 39-40.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,939 Non-Final Office Action dated Nov. 16, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Non-Final Office Action dated Jun. 18, 2009.

U.S. Appl. No. 12/181,662—Final Office Action dated Jan. 4, 2010.

Iren, et al.; "The Transport Layer: Tutorial and Survey"; ACM Computing Surveys; vol. 31, No. 4; Dec. 1999; pp. 360-405.

International Search Report and Written Opinion for PCT/EP2009/051447 dated Jul. 1, 2009.

International Search Report and Written Opinion for PCT/EP2009/051483 dated Jul. 27, 2009.

(56) References Cited

OTHER PUBLICATIONS

Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Peterson; "Information Techonology, Fibre Channel Protocol for SCSI, Fourth Version (FCP-3)", Draft Proposed American National Standard, Jun. 2004; pp. 1-142.
U.S. Appl. No. 11/548,060 Non-Final Office Action dated Apr. 15, 2008.
U.S. Appl. No. 11/548,093 Non-Final Office Action dated Apr. 17, 2008.
Golasky, Richard; "Link-Level Error Recovery With Tape Backup"; Dell Power Solutions; Aug. 2005; pp. 88-91.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Snively, et al.; "Fibre Channel, Framing and Signaling"; (FC-FS) Rev. 1.70; NCITS Working Draft Proposed American National Standard for Information Technology; Feb. 2002; pp. i-575.
Stone, et al.; "When the CRC and TCP Checksum Disagree"; SIGCOMM '00, Stockholm, Sweden; Jul. 2000; 10 pages.
U.S. Appl. No. 12/183,315, filed Jul. 31, 2008.
U.S. Appl. No. 12/183,323, filed Jul. 31, 2008.
U.S. Appl. No. 12/183,305, filed Jul. 31, 2008.
"z/Architecture-Principles of Operation," IBM Publication No. SA22-7832-04, 5th Ed., Sep. 2005.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 13/075,993 Non Final Office Action Mailed Aug. 31, 2011.
U.S. Appl. No. 12/030,932, Notice of Allowance mailed Nov. 1, 2011.
U.S. Appl. No. 12/030,981 Non Final Office Action Mailed Aug. 2, 2011.
U.S. Appl. No. 12/030,938, Notice of Allowance Mailed Aug. 8, 2011.
U.S. Appl. No. 12/030,989, Notice of Allowance Mailed Aug. 5, 2011.
U.S. Appl. No. 12/031,042, Non-Final Office Action Mailed Sep. 30, 2011.
U.S. Appl. No. 12/031,201 Final Office Action dated Jun. 13, 2011.
U.S. Appl. No. 12/946,514, Non-Final Office Action Mailed Jun. 23, 2011.
U.S. Appl, No. 12/183,323, Notice of Allowance Mailed Jun. 23, 2011.
URL, http://en.wikipedia.org/wiki/FICON, FICON, Wikipedia, USA, Wikimedia Foundation, Inc., Aug. 9, 2011,.
U.S. Appl. No. 13/024,468, Non Final Office Action Mailed Jan. 26, 2012.
U.S. Appl. No. 12/031,182 Non-Final Office Action dated Mar. 16, 2012.
U.S. Appl. No. 13/075,993, Final Office Action Mailed Feb. 13, 2012.
U.S. Appl. No. 12/030,981, Notice of Allowance mailed Jan. 27, 2012.
U.S. Appl. No. 12/031,023, Non-Final Office Action Mailed Feb. 1, 2012.
U.S. Appl. No. 13/351,073, Non Final Office Action Mailed Mar. 30, 2012.
U.S. Appl. No. 12/030,993 Notice of Allowance Mailed Dec. 22, 2011.
U.S. Appl. No. 12/031,042, Notice of Allowance Mailed Feb. 29, 2012.
U.S. Appl. No. 12/030,912 Notice of Allowance Mailed on Feb. 26, 2013.
Aboda, B.-et al.; Network Working Group; "Securing Block Storage Protocols Over IP"; ACM Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
U.S. Appl. No. 12/030,951, Notice of Allowance Mailed Apr. 4, 2011.
U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for Hba Models"; Google; Revision A; Nov. 2010.
Petersen, MK.-et al.; "DIF/DIX Aware Linux SCSI HBA Interface"; Google; Oracle Linux Engineering; Jul. 2008.
Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.
Brice, et al.; U.S. Appl. No. 11/464,613; "Flexibility Controlling the Transfer of Data Between Input/Output Devices and Memory"; filed Aug. 15, 2006; Specification having 23 pages and Drawings having 4 sheets.
Hathorn, et al.; U.S. Appl. No. 11/468,720; "Control of Information Units in Fibre Channel Communications"; filed Aug. 30, 2006. Specification having 26 pages and Drawings having 6 sheets.
"IBM® z/Architecture Principles of Operation", Publication No. SA22-7832-05, 6th Edition, Apr. 2007. 1,215 pages separated into 4 electronic attachments.
Nordstrom, G.M.; "Sequence Reception Method for a Fibre Channel Protocol Chip"; IBM Technical Disclosure Bulletin; vol. 38, No. 12; Dec. 1995; pp. 267-269.
"Protocol for Insochronous Traffic Over Fiber Channel Switching"; IBM Technical Disclosure Bulletin; vol. 37, No. 06B; Jun. 1994. pp. 377-380.
Sachs, M.W.; "I/O Marker Changing"; IBM Technical Disclosure Bulletin; vol. 37, No. 02A; Feb. 1994; pp. 75-76.
Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.
Srikrishnan, et al. "Sharing FCP Adapters Through Virtualization"; IBM J. Res. & Dev., vol. 51, No. 1/2; Jan./Mar. 2007; pp. 103-118.
U.S. Appl. No. 12/030,967 Restriction Requirement Mailed Dec. 29, 2009.

(56) References Cited

OTHER PUBLICATIONS

ANSI INCITS 433-2007, Information Technology Fibre Channel Link Services (FC-LS), Jul. 2007.
Fibre Channel Single Byte Command Code Sets-2 Mapping Protocol (FC-SB-3), T11/Project 1357-D/Rev 1.6, INCITS Mar. 2003.
U.S. Appl. No. 12/030,951 Non-Final Office Action dated May 20, 2010.
U.S. Appl. No. 12/031,038, Non-Final Office Action Mailed Apr. 15, 2010.
U.S. Appl. No. 12/030,975. Final Office Action Mailed May 13, 2010.
U.S. Appl. No. 12/030,967, Notice of Allowance mailed Apr. 23, 2010.
U.S. Appl. No. 12/030,985, Non Final Office Action Mailed May 5, 2010.
U.S. Appl. No. 12/031,042, Non-Final Office Action Mailed Apr. 5, 2010.
U.S. Appl. No. 12/031,021, Notice of Allowance Mailed Apr. 30, 2010.
U.S. Appl. No. 12/183,305, Non-Final Office Action Mailed May 11, 2010.
U.S. Appl. No. 12/183,315 Notice of Allowance dated Jun. 15, 2010.
U.S. Appl. No. 12/030,989 Final Office Action dated May 24, 2010.
SCSI Primary Commands—4 (SPC-4); Project T10/1731-D. Rev 11. INCITS Apr. 14, 2010.
US Application No. 12/030,920 Non-Final Office Action dated Feb. 23, 2010.
U.S. Appl. No. 12/030,954 Non-Final Office Action dated Jan. 21, 2010.
Written Opinion and International Search Report for PCT/EP2009/051461 dated Sep. 22, 2009.
U.S. Appl. No. 12/031,182 Non-Final Office Action dated Jan. 22, 2010.
U.S. Appl. No. 12/031,201 Non-Final Office Action dated Jan. 25, 2010.
International Search Report; International Application No. PCT/EP2009/059184; International Filing Date: Jul. 16, 2009; Date of mailing: Jan. 14, 2010; 9 pages.
U.S. Appl. No. 12/031,021, Notice of Allowance Mailed Jul. 8, 2010.
U.S. Appl. No. 12/183,315, Notice of Allowance Mailed on Jun. 15, 2010.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.

* cited by examiner

DETERMINING EXTENDED CAPABILITY OF A CHANNEL PATH

CROSS REFERENCE TO RELATED APPLICATIONS

This application is a continuation of U.S. patent application Ser. No. 12/030,912 filed Feb. 14, 2008, the entire disclosure of which is incorporated herein by reference.

BACKGROUND OF THE INVENTION

1. Field of Invention

The present disclosure relates generally to input/output processing, and in particular, to determining extended capability of a channel path in an input/output processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entirety. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. However, altering command sequences, as well as roles of the channel subsystem and the control units, can cause difficulties in interfacing with control units that support different modes of operation in the same I/O processing system.

It would be beneficial to support control units capable of executing commands absent CCW interpretation by the channels, as well as legacy control units that require the channels to parse lists of CCWs. It would also be desirable to support new functionality on a channel path basis as an extension of existing capability, rather than creating an entirely new channel path type. In order to send commands using such a system, it would be advantageous to provide notice of the capability supported by each channel path such that commands can be formatted in compliance with each channel path configuration. Accordingly, there is a need in the art for determining extended capability of a channel path in an I/O processing system.

BRIEF SUMMARY OF THE INVENTION

An embodiment of a computer program product for determining extended capability of a channel path in an input/output (I/O) processing system is provided. The computer program product includes a tangible storage medium readable by a processing circuit and storing instructions for execution by the processing circuit for performing a method including: receiving a request at a channel subsystem in a host computer system from an operating system in the host computer system to provide a channel path description for a channel path, wherein the channel path includes a channel configured to be coupled to a control unit configured to operate and control one or more I/O devices, the channel subsystem configured to direct information flow between memory and the control unit via the channel path; and outputting from the channel subsystem to the operating system, a channel path description block including the channel path description for the channel path in response to the request. The channel path description block includes: a descriptor field (DESC) indicating that the channel path supports a Fibre Channel protocol for commanding an I/O operation; and an extension support indicator field (F) specifying whether the channel path supports an extension to the Fibre Channel protocol.

An embodiment of an apparatus for determining extended capability of a channel path in an input/output (I/O) processing system is provided. The apparatus includes a channel subsystem in a host computer system for communication with a control unit via a channel path, the channel subsystem including one or more channel paths including one or more channels configured to be coupled to a control unit configured to operate and control one or more I/O devices, the channel subsystem configured to direct information flow between memory and one or more I/O devices via the channel path, the channel subsystem configured to perform a method. The method includes: receiving a request at the channel subsystem from an operating system in the host computer system to provide a channel path description for the channel path; and outputting from the channel subsystem to the operating system, a channel path description block including the channel path description for the channel path in response to the request. The channel path description block includes: a descriptor field (DESC) indicating that the channel path supports a Fibre Channel protocol for commanding an I/O operation; and an extension support indicator field (F) specifying whether the channel path supports an extension to the Fibre Channel protocol.

A method for determining extended capability of a channel path in an input/output (I/O) processing system is provided. The method includes: receiving a request at a channel subsystem in a host computer system from an operating system in the host computer system to provide a channel path description for a channel path, wherein the channel path includes a channel configured to be coupled to a control unit configured to operate and control one or more I/O devices, the channel subsystem configured to direct information flow between memory and the control unit via the channel path; and outputting from the channel subsystem to the operating system a channel path description block including the channel path description for the channel path in response to the request. The channel path description block includes: a descriptor field indicating that the channel path supports a Fibre Channel protocol for commanding an I/O operation; and an extension support indicator field specifying whether the channel path supports an extension to the Fibre Channel protocol.

Other computer program products, apparatuses, and/or methods according to embodiments will be or become apparent to one with skill in the art upon review of the following drawings and detailed description. It is intended that all such additional computer program products, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
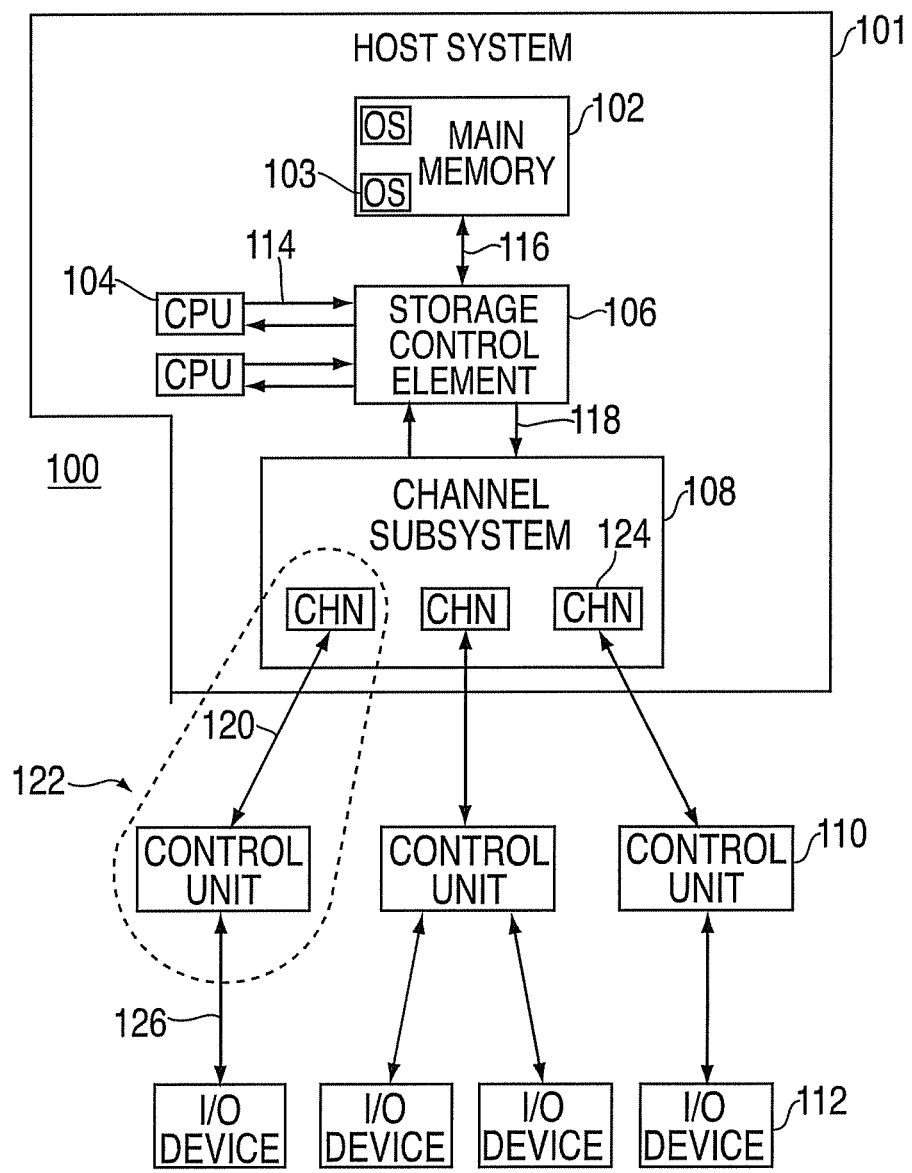
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling access to information, such as status and measurement data, associated with I/O processing. Further, I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the control unit generates a response message in response to executing the channel program. The control unit may also generate a response message without executing the channel program when an exception condition is detected, such as an error in the channel program that prevents execution. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting the status and extended status information, and provides feedback to processing elements of the I/O processing system.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220. The read command 306 (FIG. 3) is fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
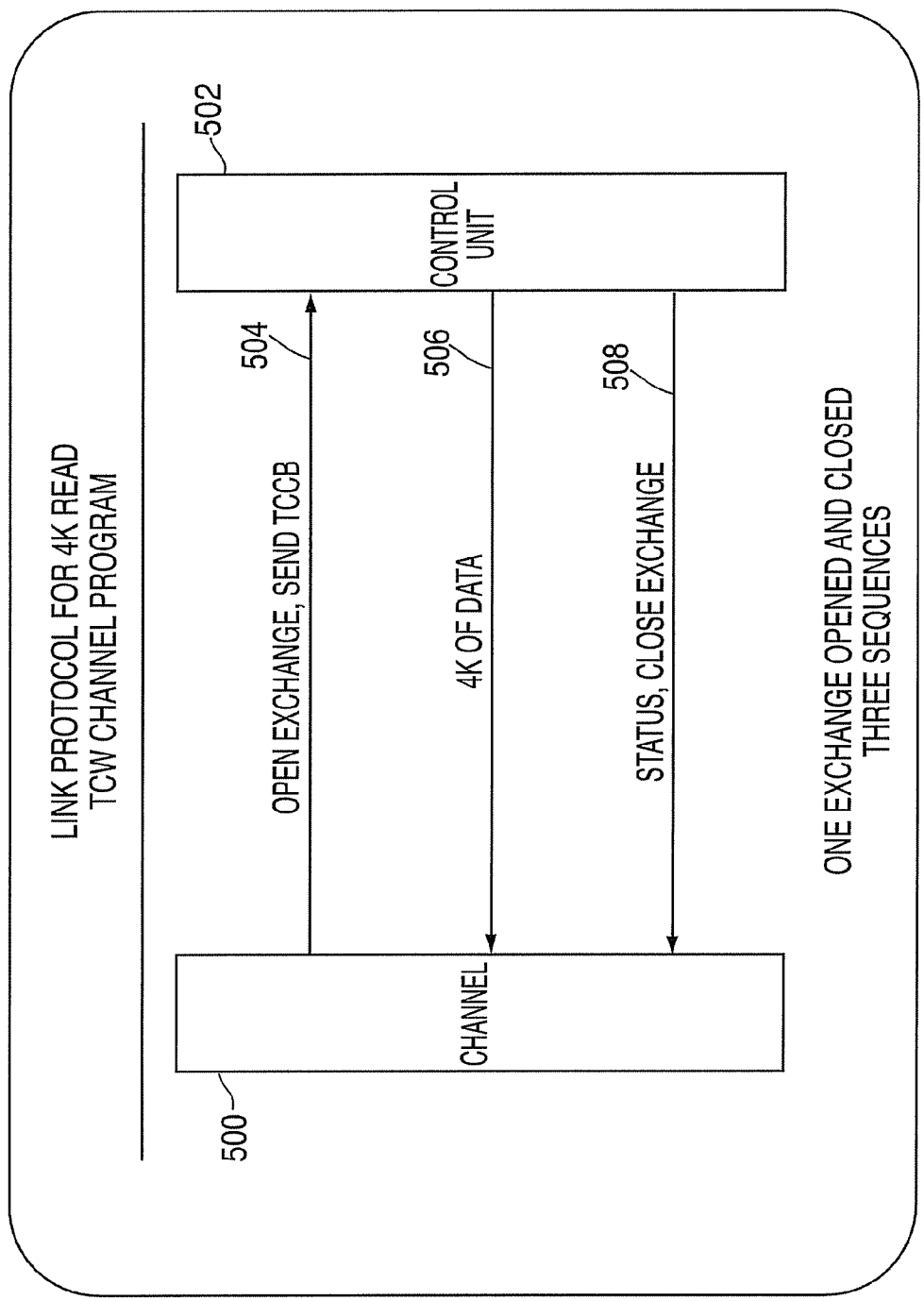
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs), also referred to as descriptor control words)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP IU payload may be used to transport FICON ending status along with additional status information, including parameters that support the calculation of extended measurement words and notify the channel 500 of the maximum number of open exchanges supported by the control unit 502.

In a further example, to write 4 k of customer data, the channel 500 uses the FCP link protocol phases, as follows:
1. Transfer a TCCB in the FCP_CMND IU.
2. Transfer the IU of data, and sequence initiative to the control unit 502.
(FCP Transfer Ready Disabled)
3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 2:
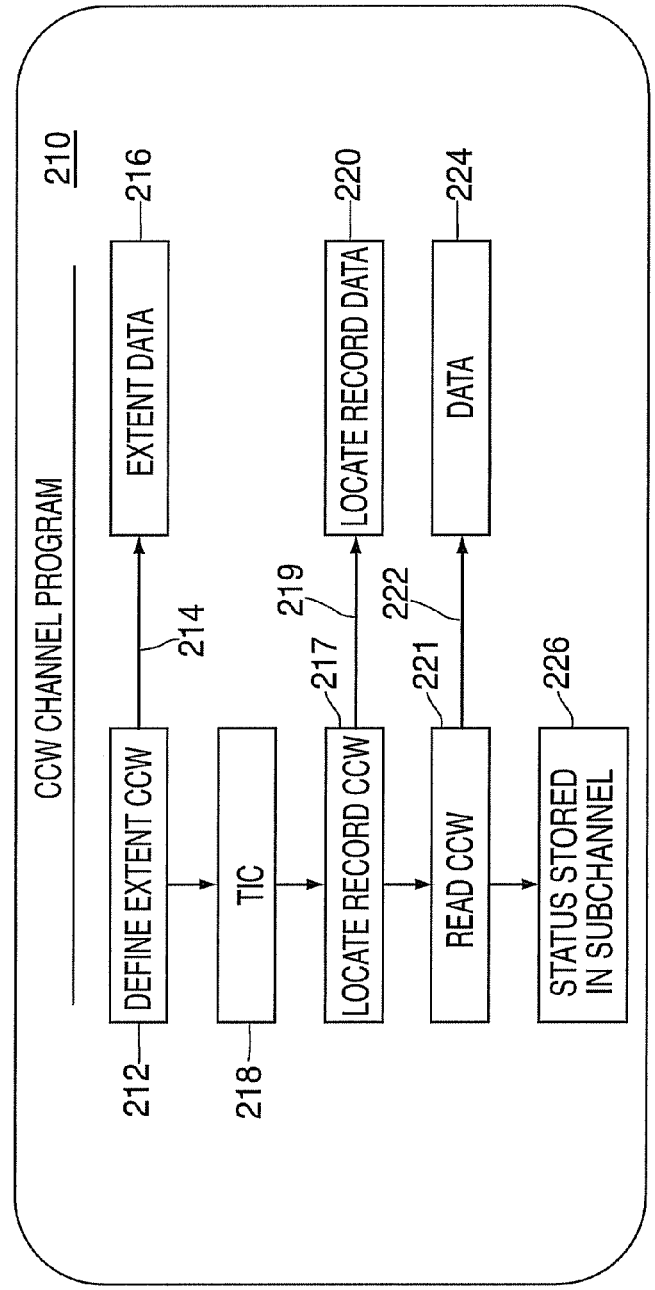
FIG. 2A depicts one example of a prior art channel command word.
FIG. 2B depicts one example of a prior art channel command word channel program.
Figure 3:
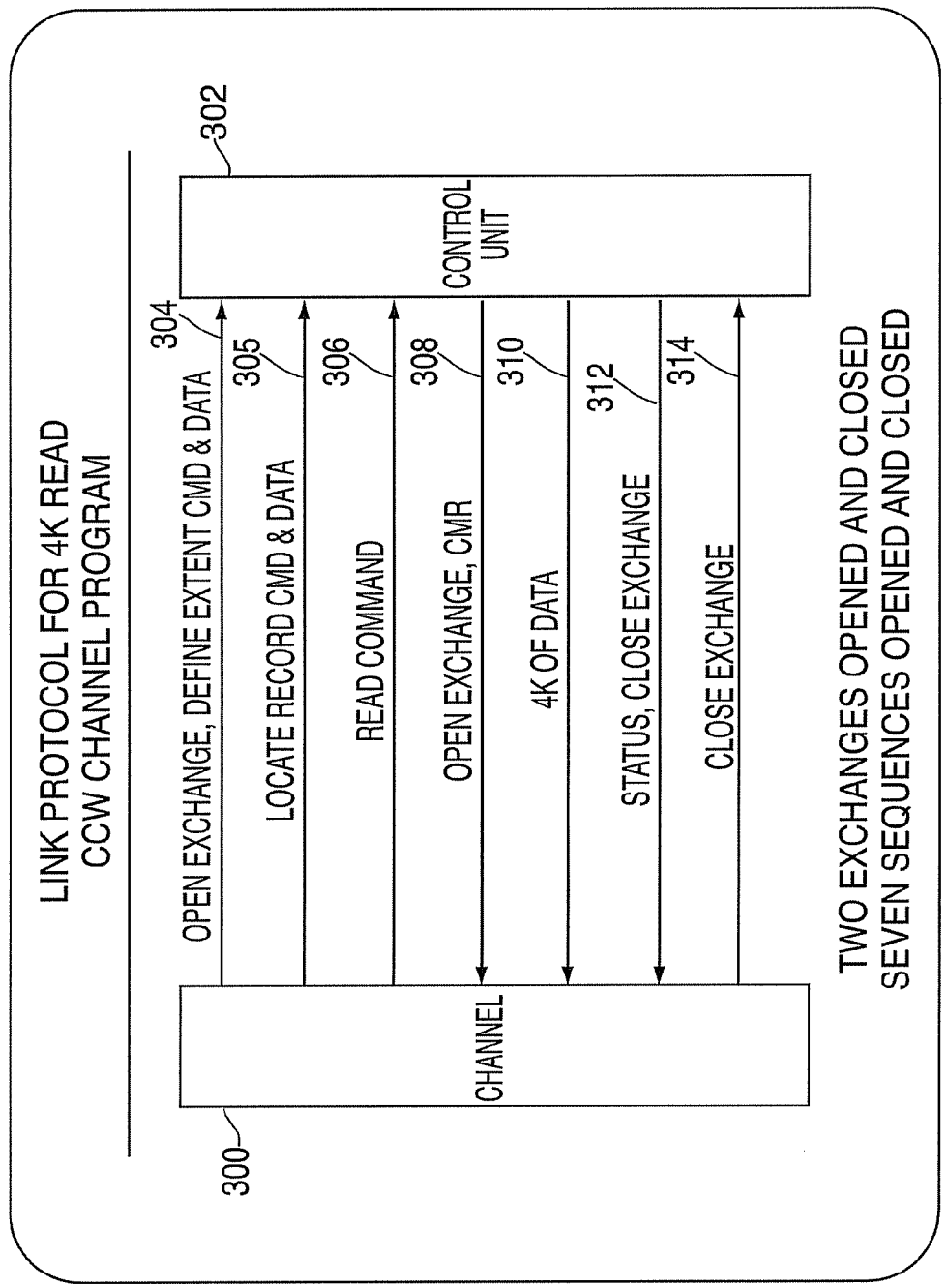
FIG. 3 depicts one embodiment of a prior art link protocol used in communicating between a channel and control unit to execute the channel command word channel program of FIG. 2B.
Figure 4:
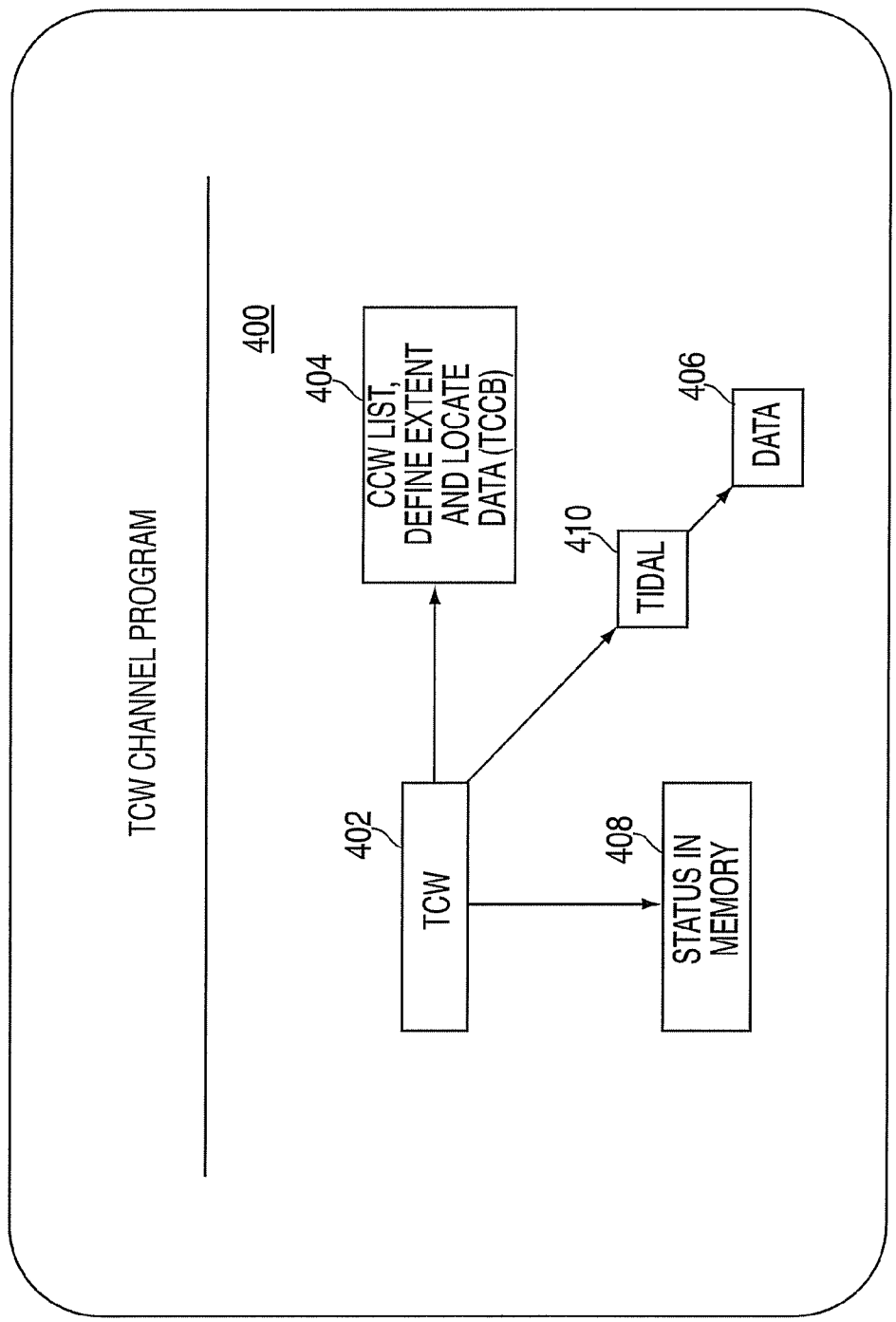
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

Figure 6:
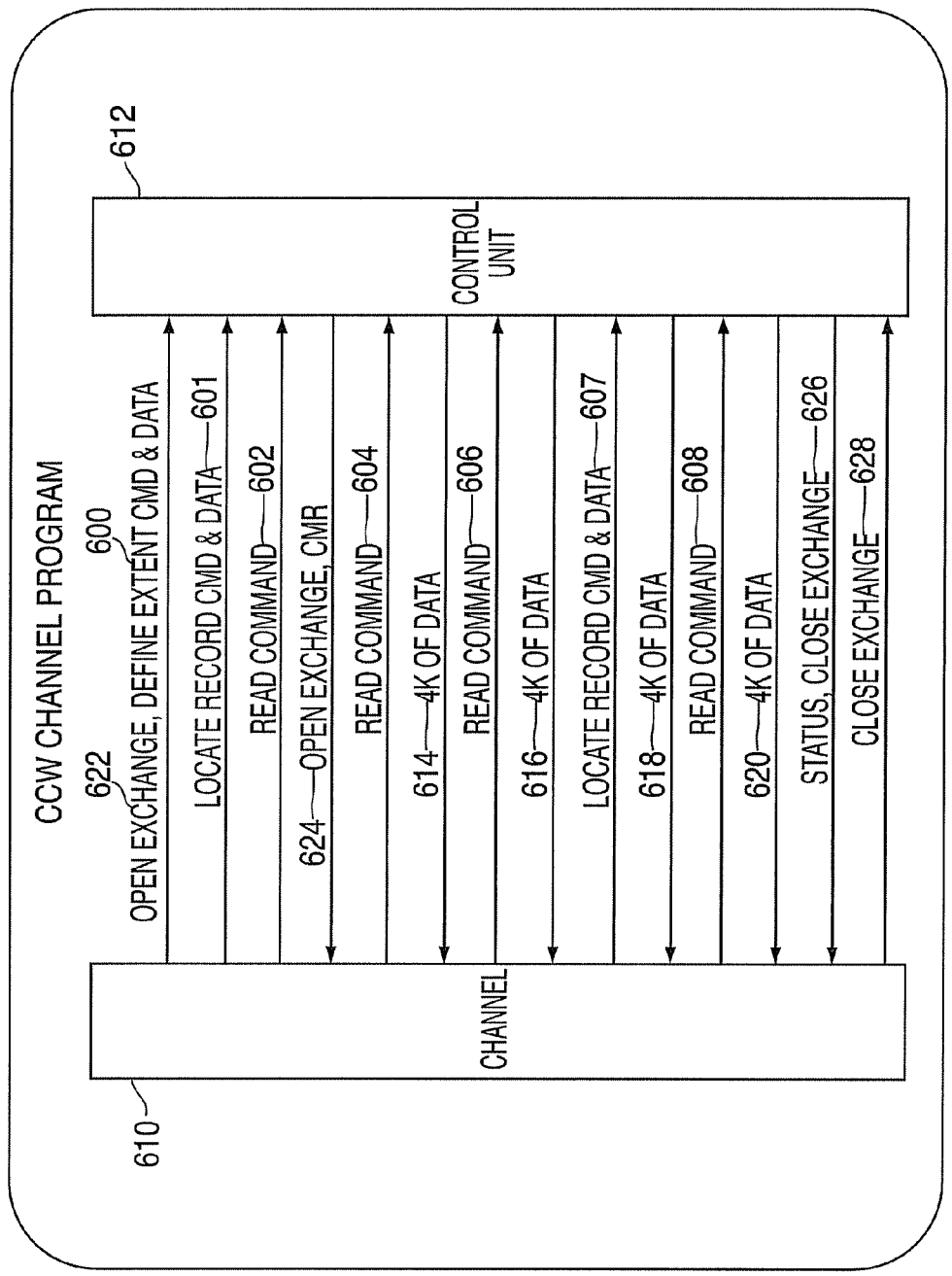
FIG. 6 depicts one embodiment of a prior art link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
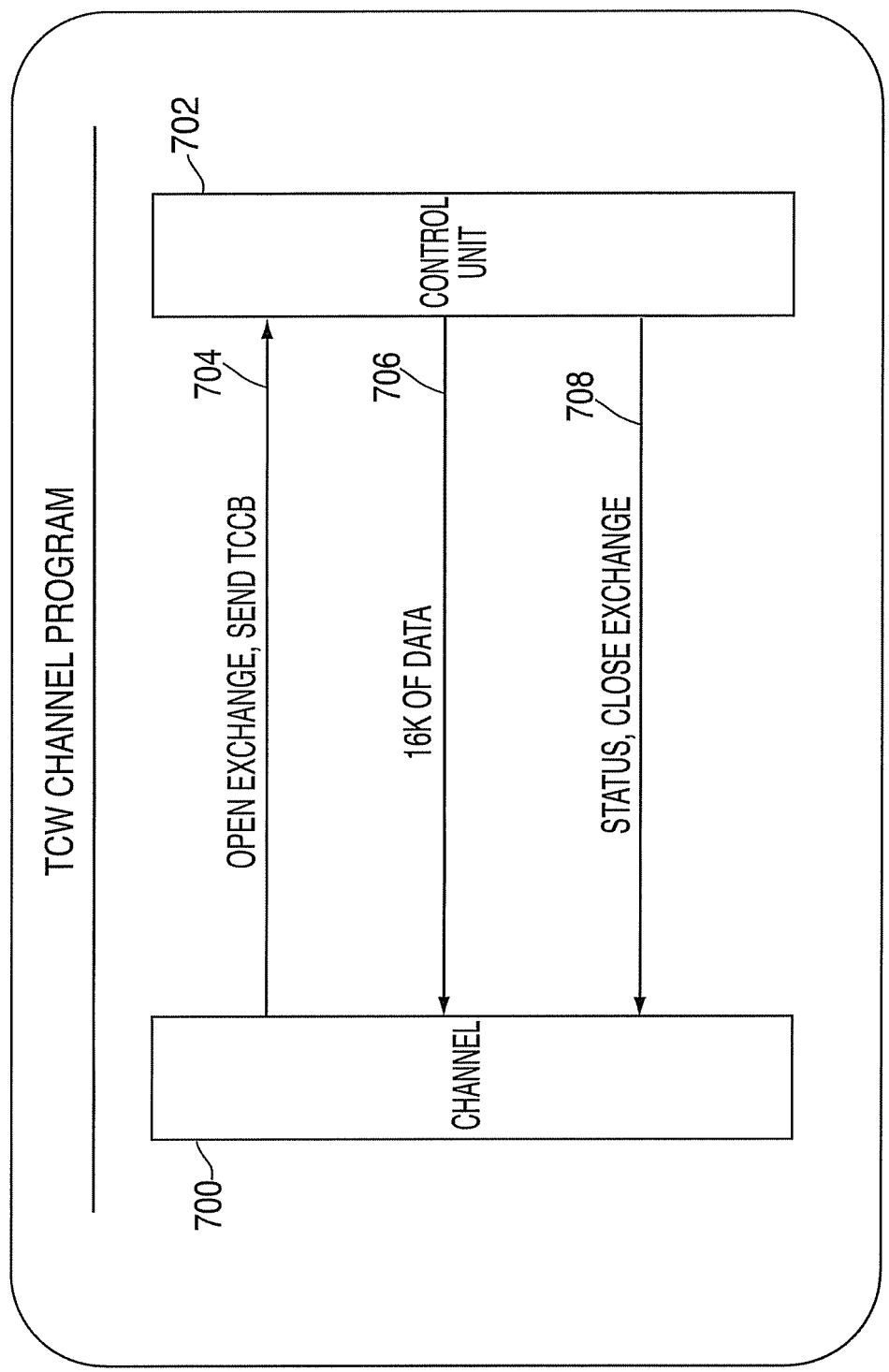
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much less communications to transfer the same amount of data as the CCW channel program of FIG. 6.

Figure 8:
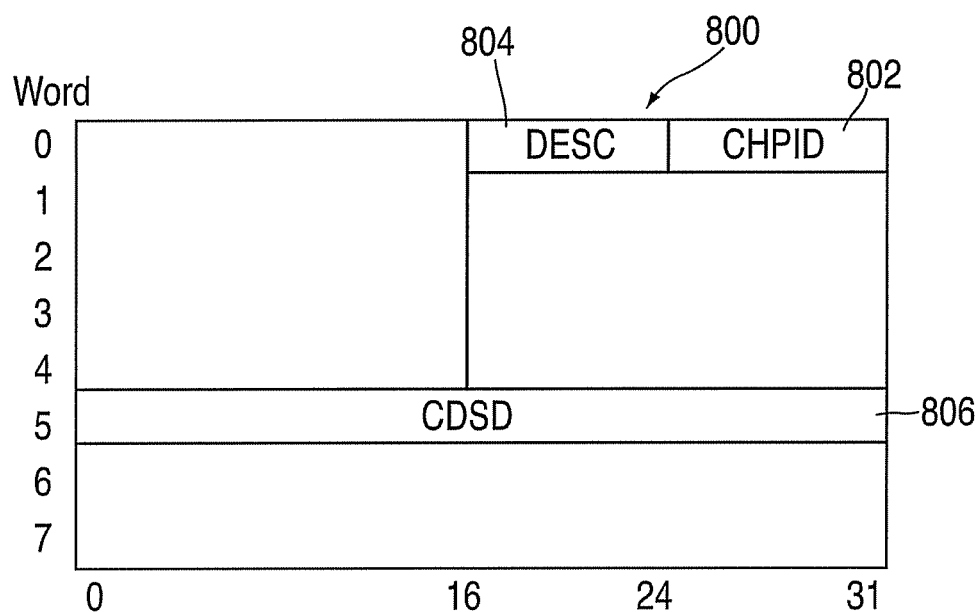
FIG. 8 depicts one embodiment of fields in a channel path description block, in accordance with an aspect of the present invention.

In one embodiment, the I/O processing system 100 of FIG. 1 executes both CCW channel programs and TCW channel programs on a per channel path 122 basis. Thus, while some control units 110 may only support legacy CCW channel programs, other control units 110 can support extended capability of interpreting and performing TCW channel programs. The channel subsystem 108 can track the capability of each channel path 122 and report the capability to OSs 103 or other programs executed by CPUs 104. For example, one of the OSs 103 may send a request to the channel subsystem 108 for a channel path description to establish the capability of channel path 122. The channel subsystem 108 can respond providing capability information for channel path 122. One example of a response to a request for a channel path description is depicted in FIG. 8, which illustrates a channel-path description block 800 in accordance with an exemplary embodiment. As shown in FIG. 8, the channel-path description block 800 includes a channel path identifier (CHPID) 802, a descriptor (DESC) 804, and channel description specific data (CDSD) 806. It will be understood that other fields can be included in the channel-path description block 800 which are not depicted in FIG. 8.

Figure 9:
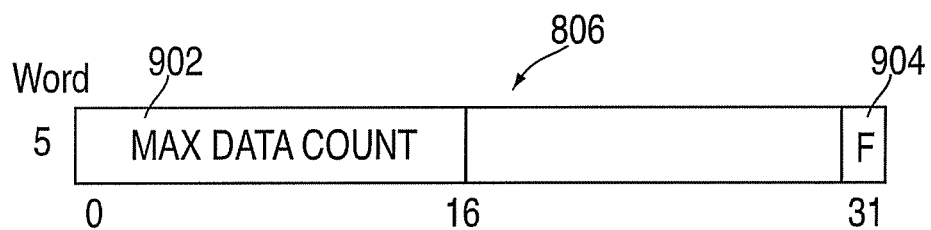
FIG. 9 depicts one embodiment of a channel description specification data field in a channel path description block, in accordance with an aspect of the present invention.

The CHPID 802 may be used to establish the channel path 122 associated with the channel-path description block 800. The definition of the CDSD 806 can vary based on the value of the DESC 804. For example, when the DESC 804 indicates that channel path 122 of FIG. 1 is capable of performing a command mode link protocol (e.g., supporting a Fibre Channel link protocol), and an extension to the link protocol is installed (e.g., Fibre Channel Extension (FCX) using transport mode), the CDSD 806 may be defined as shown in FIG. 9. In an exemplary embodiment depicted in FIG. 9, the CDSD 806 includes a max data count 902 and an F field 904. The F field 904 is an extension support indicator that specifies whether the channel path 122 supports an extension to the link protocol, for instance, FCX. The F field 904 may further indicate that the max data count 902 is valid. In an exemplary embodiment, when the max data count 902 is valid, it contains a 16-bit unsigned integer with a value that is the maximum count of customer data in units of 64K-bytes that the TCCB may transfer. The sum of the data byte count fields in all of the DCWs in a single transport command area (TCA) in a TCCB may not exceed this value. Thus, the count represented by the max data count 902 may be in the range of 65,536 to 4,294,901,760 bytes. The relationship of a TCA to a TCCB is further defined in reference to FIG. 10. When the F field 904 indicates that extension to the link protocol is not supported by the channel path 122, then values associated with the max data count 902 can have an alternate definition, e.g., set to a value of zero. According to an exemplary embodiment, a program interface in the host system 101 of FIG. 1, such as OS 103, interprets the amount of customer data that can be sent via the channel subsystem 108 from a single program-initiated operation when the extension to the link protocol is supported.

Figure 10:
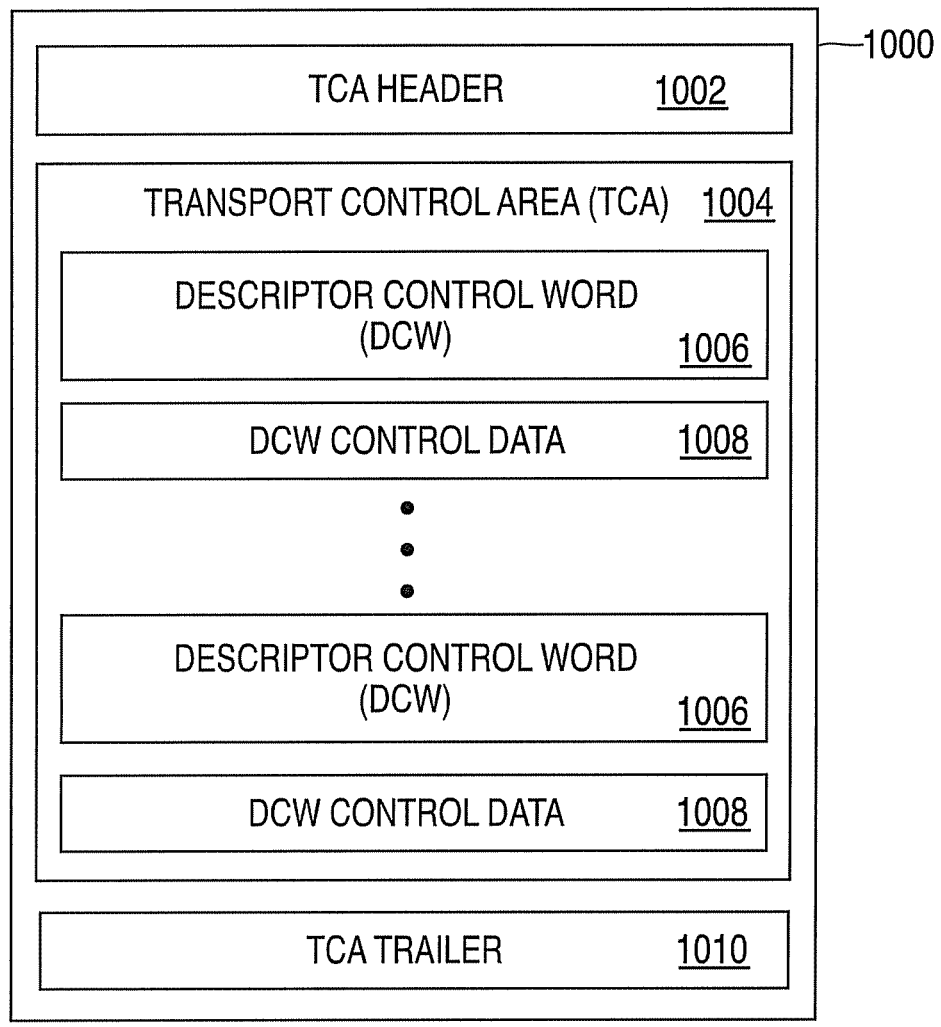
FIG. 10 depicts one embodiment of a transport command control block in accordance with an aspect of the present invention.

FIG. 10 depicts one embodiment of a TCCB 1000 in accordance with an aspect of the present invention. As described previously, the TCCB 1000 is a control block built by software and then the channel 124 sends it to a control unit 110 (e.g., in a Transport Command IU) for execution. The TCCB 1000 contains the commands to be executed by the control unit 110 and any control data required by the commands. The channel 124 does not look at the contents of the TCCB 1000. The channel 124 packages the TCCB 1000 and sends it to the control unit 110. This allows FCP transport protocols to be utilized instead of FICON, as an extension of the command set available for FICON. The TCCB 1000 is part of a TCW channel program, such as that depicted in FIGS. 4 and 7.

The TCCB 1000 includes a transport control area header (TCAH) 1002 which, in an exemplary embodiment, includes information about the transmit control area (TCA) 1004 and operations within the TCA 1004 (e.g., length, service code). In an exemplary embodiment the TCAH 1002 includes a format control field for specifying information such as the format of the TCCB (e.g., variable length CDB format), the mode associated with the TCCB (e.g., transport mode), service action codes set aside to be used as vendor unique code points, and a field to provide the control unit the priority in which to execute this TCCB 1000.

The TCCB 1000 depicted in FIG. 10 also includes a variable length TCA 1004 which includes one or more DCWs 1006 and corresponding DCW control data 1008, if any for each DCW 1006. As previously described, the max data count field 902 of FIG. 9 limits the maximum amount of customer data that a TCCB may transfer. The DCW control data 1008 may be of variable length. In an exemplary embodiment, each DCW 1006 includes a command code, flags (chaining), control data length (count), and read/write data length (count) fields. The sum of the read/write data length fields in all of the DCWs in a TCA may not exceed the max data count field 902. DCW control data 1008 is optional (depending on the DCW 1006) and includes control parameters for its corresponding DCW 1006. For example, DCW control data 1008 may include define extent and/or prefix parameters. In an exemplary embodiment, the DCW control data 1008 follows its corresponding DCW 1006 within the TCA 1004 and is not pointed to by the DCW 1006. In addition, the TCCB 1000 includes a TCA trailer (TCAT) 1010 that contains data such as the count of the bytes to be transferred by the TCCB 1000 and a check word field to check the integrity of the TCCB 1000.

Figure 11:
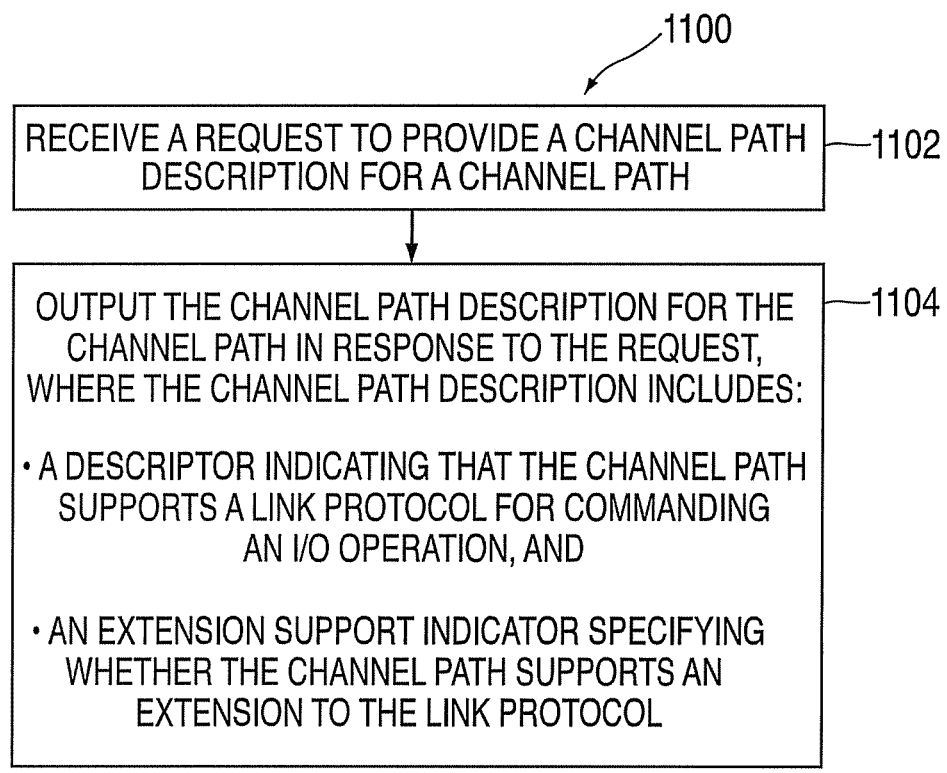
FIG. 11 depicts one embodiment of a process for determining extended capability of a channel path in an I/O processing system.

Turning now to FIG. 11, a process 1100 for determining extended capability of a channel path an I/O processing system will now be described in accordance with exemplary embodiments, and in reference to the I/O processing system 100 of FIG. 1. At block 1102, the channel subsystem 108 receives a request to provide a channel path description for channel path 122, where the channel path 122 includes channel 124 coupled to control unit 110. OS 103 may initiate the request. In an exemplary embodiment, the link protocol supports CCW channel programs and the extension to the link protocol supports TCW channel programs. For example, the link protocol can be Fibre Channel, and the extension is FCX.

At block 1104, the channel subsystem 108 outputs the channel path description, for instance, channel-path description block 800 of FIG. 8, for the channel path 122 in response to the request. The channel path description includes a descriptor (DESC 804) indicating that the channel path 122 supports a link protocol for commanding an I/O operation. The channel path description may also include an extension support indicator, for example, the F field 904 in CDSD 806, specifying whether the channel path 122 supports an extension to the link protocol. The channel subsystem 108 may output additional information in CDSD 806 associated with the descriptor in response to the request, where the CDSD 806 is defined as a function of the descriptor. For example, the CDSD 806 can be a field in the channel-path description block 800 that has different definitions depending upon the value of the DESC 804. The CDSD 806 may include the max data count 902 of FIG. 9 indicating a maximum count of customer data the TCCB may transfer, supported by the channel path 122 when communicating via the extension to the link protocol. The CDSD 806 can also include a validity indicator establishing validity of the max data count 902. In an exemplary embodiment, the extension support indicator is the validity indicator, e.g., F field 904 of FIG. 9 provides validity of the max data count 902 and indicates that the extension to the link protocol is supported.

Technical effects and benefits of exemplary embodiments include determining extended capability of a channel path in an I/O processing system. Using one or more fields in a channel path description block to define channel path capability allows software to determine the capability of the channel path such that properly formatted CCW or TCW channel programs can be executed. Advantages include support for both CCW channel programs and TCW channel programs on a channel path basis in the same I/O processing system. Further advantages include establishing a configurable maximum amount of customer data that can be transferred to or from the host by a sum of data counts in each DCW in a TCCB of a TCW channel program.

Figure 12:
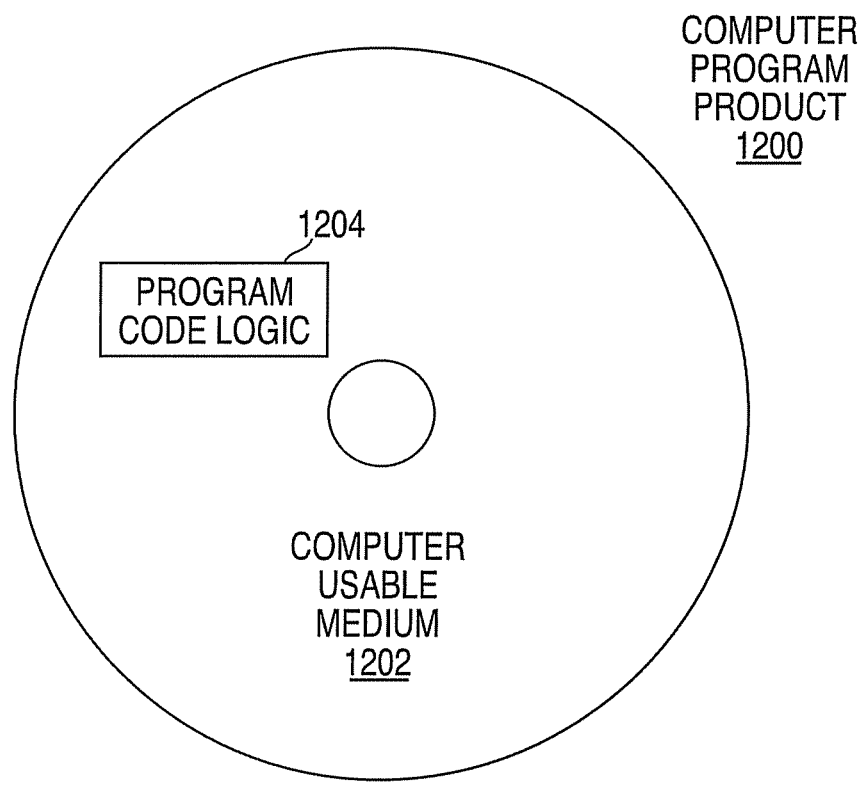
FIG. 12 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1200 as depicted in FIG. 12 on a computer usable medium 1202 with computer program code logic 1204 containing instructions embodied in tangible media as an article of manufacture. Exemplary articles of manufacture for computer usable medium 1202 may include floppy diskettes, CD-ROMs, hard drives, universal serial bus (USB) flash drives, or any other computer-readable storage medium, wherein, when the computer program code logic 1204 is loaded into and executed by a computer, the computer becomes an apparatus for practicing the invention. Embodiments include computer program code logic 1204, for example, whether stored in a storage medium, loaded into and/or executed by a computer, or transmitted over some transmission medium, such as over electrical wiring or cabling, through fiber optics, or via electromagnetic radiation, wherein, when the computer program code logic 1204 is loaded into and executed by a computer, the computer becomes an apparatus for practicing the invention. When implemented on a general-purpose microprocessor, the computer program code logic 1204 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for determining extended capability of a channel path in an input/output (I/O) processing system, the computer program product comprising:
a non-transitory computer-readable storage medium readable by a processing circuit and storing instructions for execution by the processing circuit for performing a method comprising:
receiving a request at a channel subsystem in a host computer system from an operating system in the host computer system to provide a channel path description for a channel path, wherein the channel path includes a channel configured to be coupled to a control unit configured to operate and control one or more I/O devices, the channel subsystem configured to direct information flow between memory and the control unit via the channel path; and
outputting from the channel subsystem to the operating system, a channel path description block including the channel path description for the channel path in response to the request, wherein the channel path description block includes: a descriptor field (DESC) indicating that the channel path supports a Fibre Channel protocol for commanding an I/0 operation; and
an extension support indicator field (F) specifying whether the channel path supports an extension to the Fibre Channel protocol.

2. The computer program product of claim 1, wherein:
the extension support indicator field (F) is contained within a channel description specific data (CDSD) field.

3. The computer program product of claim 2, wherein in response to the F field being '1', the CDSD includes a maximum data count field indicating a maximum count of a sum of data count fields in all device control words (DCWs) in a transport command area (TCA) of a command message supported by the channel path when communicating via the extension to the Fibre Channel protocol.

4. The computer program product of claim 1, wherein the Fibre Channel protocol supports channel command word (CCW) channel programs configured to support at least one CCW that specifies a command for performing an I/O operation, and the extension to the Fibre Channel protocol supports transport control word (TCW) channel programs configured to support at least one transport command control block (TCCB), the TCCB configured to be sent from the channel subsystem to the control unit and configured to hold a plurality of commands for performing an I/O operation.

5. The computer program product of claim 1, wherein the descriptor field indicates that the channel path supports the Fibre Channel protocol, and the extension support indicator field is included in a channel description specific data (CDSD) field that is defined as a function of the descriptor field.

6. The computer program product of claim 3, wherein in response to the F field being '0', the maximum data count field has a value of '0'.

7. The computer program product of claim 3, wherein the method further comprises: in response to the descriptor field (DESC) not indicating that the channel path is capable of performing both a command mode link protocol supporting the Fibre Channel protocol and an extension to the Fibre Channel protocol using transport mode, the channel description specific data (CDSD) field absent the extension support indicator field (F) specifying whether the channel path supports an extension to the Fibre Channel protocol.

8. The computer program product of claim 3, wherein the TCA is included in a transport command control block (TCCB) sent from a channel to a control unit, the TCA comprising one or more DCWs, and wherein the maximum data count field represents a number of 64K bytes of data.

9. An apparatus for determining extended capability of a channel path in an input/output (I/O) processing system, the apparatus comprising:
   a channel subsystem in a host computer system for communication with a control unit via a channel path, the channel subsystem including one or more channel paths including one or more channels configured to be coupled to a control unit configured to operate and control one or more I/O devices, the channel subsystem configured to direct information flow between memory and one or more I/O devices via the channel path, the channel subsystem configured to perform a method comprising:
   receiving a request at the channel subsystem from an operating system in the host computer system to provide a channel path description for the channel path; and
   outputting from the channel subsystem to the operating system, a channel path description block including the channel path description for the channel path in response to the request, wherein the channel path description block includes:
   a descriptor field (DESC) indicating that the channel path supports a Fibre Channel protocol for commanding an I/O operation; and
   an extension support indicator field (F) specifying whether the channel path supports an extension to the Fibre Channel protocol.

10. The apparatus of claim 9, wherein:
    the extension support indicator field (F) is contained within a channel description specific data (CDSD) field.

11. The apparatus of claim 10, wherein in response to the extension support indicator field (F) being '1', the CDSD includes a maximum data count field indicating a maximum count of a sum of data count fields in all device control words (DCWs) in a transport command area (TCA) of a command message supported by the channel path when communicating via the extension to the Fibre Channel protocol.

12. The apparatus of claim 9, wherein the Fibre Channel protocol supports channel command word (CCW) channel programs configured to support at least one CCW that specifies a command for performing an I/O operation, and the extension to the Fibre Channel protocol supports transport control word (TCW) channel programs configured to support at least one transport command control block (TCCB), the TCCB configured to be sent from the channel subsystem to the control unit and configured to hold a plurality of commands for performing an I/O operation.

13. The apparatus of claim 9, wherein the descriptor field indicates that the channel path supports the Fibre Channel protocol, and the extension support indicator field is included in a channel description specific data (CDSD) field that is defined as a function of the descriptor field.

14. The apparatus of claim 10, wherein in response to the F field being '0', the maximum data count field has a value of '0'.

15. The apparatus of claim 10, wherein the method further comprises: in response to the descriptor field (DESC) not indicating that the channel path is capable of performing both a command mode link protocol supporting the Fibre Channel protocol and an extension to the Fibre Channel protocol using transport mode, the channel description specific data (CDSD) field absent the extension support indicator field (F) specifying whether the channel path supports an extension to the Fibre Channel protocol.

16. The apparatus of claim 10, wherein the TCA is included in a transport command control block (TCCB) sent from a channel to a control unit, the TCA comprising one or more DCWs, and wherein the maximum data count field represents a number of 64K bytes of data.

17. A method for determining extended capability of a channel path in an input/output (I/O) processing system, the method comprising:
    receiving a request at a channel subsystem in a host computer system from an operating system in the host computer system to provide a channel path description for a channel path, wherein the channel path includes a channel configured to be coupled to a control unit configured to operate and control one or more I/O devices, the channel subsystem configured to direct information flow between memory and the control unit via the channel path; and
    outputting from the channel subsystem to the operating system a channel path description block including the channel path description for the channel path in response to the request, wherein the channel path description block includes:
    a descriptor field indicating that the channel path supports a Fibre Channel protocol for commanding an I/O operation; and
    an extension support indicator field specifying whether the channel path supports an extension to the Fibre Channel protocol.

18. The method of claim 17, wherein:
    the F Field is contained within a channel description specific data (CDSD) field.

19. The method of claim 18 wherein in response to the extension support indicator field (F) being '1', the CDSD includes a maximum data count field indicating a maximum count of a sum of data count fields in all device control words (DCWs) in a transport command area (TCA) of a command message supported by the channel path when communicating via the extension to the Fibre Channel protocol.

20. The method of claim 17 wherein the Fibre Channel protocol supports channel command word (CCW) channel programs configured to support at least one CCW that specifies a command for performing an I/O operation, and the extension to the Fibre Channel protocol supports transport control word (TCW) channel programs configured to support at least one transport command control block (TCCB), the TCCB configured to be sent from the channel subsystem to the control unit and configured to hold a plurality of commands for performing an I/O operation.

21. The method of claim 17, wherein the descriptor field indicates that the channel path supports the Fibre Channel protocol, and the extension support indicator field is included in a channel description specific data (CDSD) field that is defined as a function of the descriptor field.

22. The method of claim 18, wherein in response to the F field being '0', the maximum data count field has a value of '0'.

23. The method of claim 18, further comprising: in response to the descriptor field (DESC) not indicating that the channel path is capable of performing both a command mode link protocol supporting the Fibre Channel protocol and an extension to the Fibre Channel protocol using transport mode, the channel description specific data (CDSD) field absent the extension support indicator field (F) specifying whether the channel path supports an extension to the Fibre Channel protocol.

24. The method of claim 18, wherein the TCA is included in a transport command control block (TCCB) sent from a channel to a control unit, the TCA comprising one or more DCWs, and wherein the maximum data count field represents a number of 64K bytes of data.

* * * * *